Feb. 3, 1931.    O. PFEIFFER    1,790,764
DRYING APPARATUS
Filed Jan. 27, 1928    2 Sheets-Sheet 1
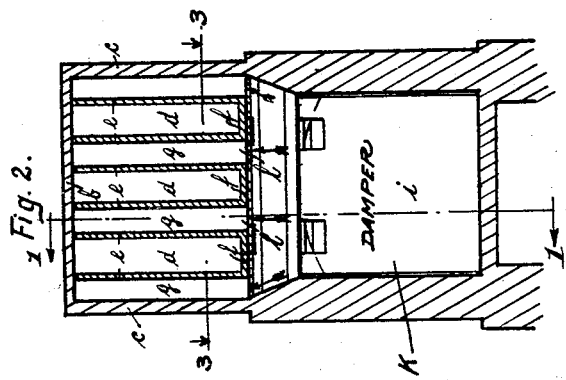
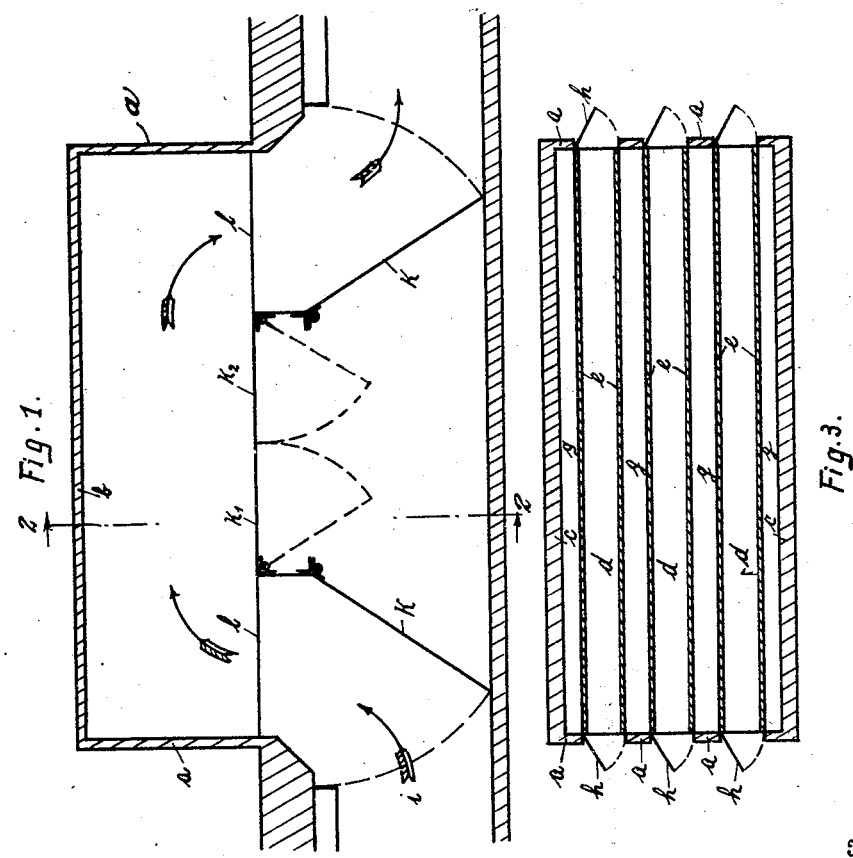
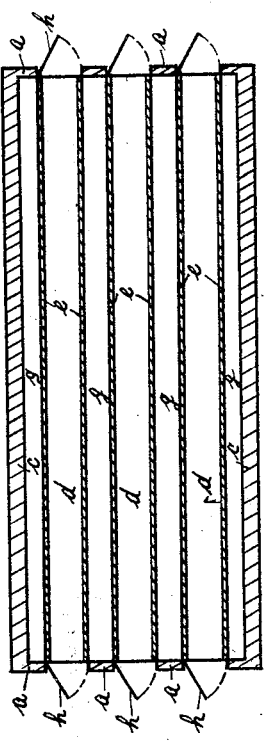
Inventor
Oswald Pfeiffer
By
Attorney

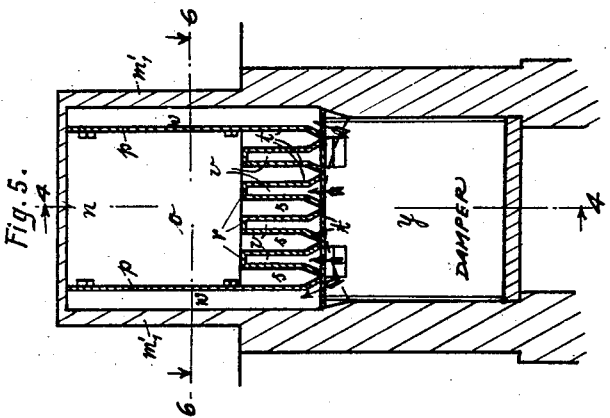
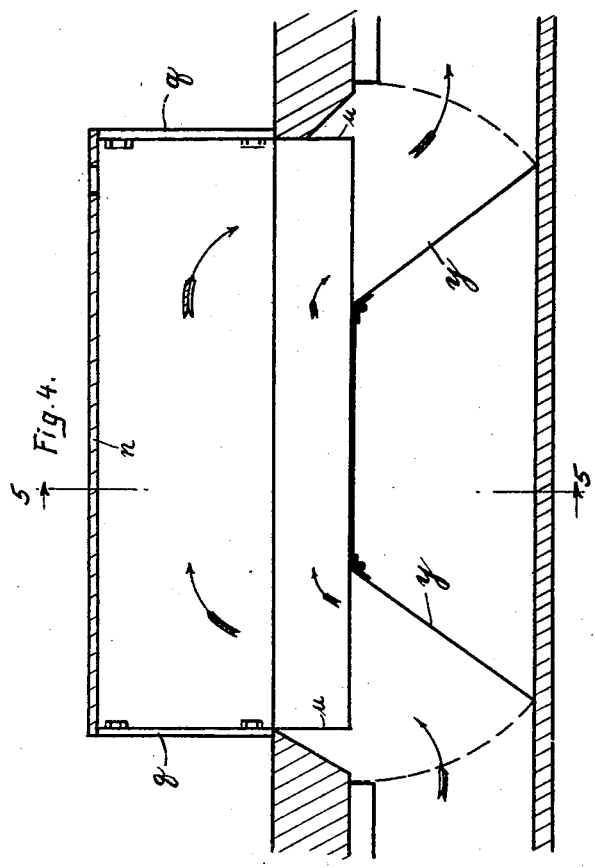
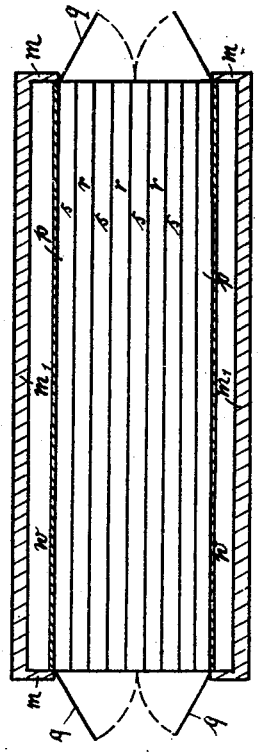

Patented Feb. 3, 1931

1,790,764

UNITED STATES PATENT OFFICE

OSWALD PFEIFFER, OF LEIPZIG, GERMANY

DRYING APPARATUS

Application filed January 27, 1928, Serial No. 250,049, and in Germany July 16, 1925.

This invention relates to a drying apparatus heated with flue-gases and composed of several chambers.

Drying apparatus have become known in which the required heat is withdrawn from the flue-gases.

According to the invention the drying apparatus is mounted above the main flue behind a boiler-furnace or the like in such a manner that the waste heat of the flue-gases is utilized for heating by direct contact with the chamber-walls. With this object in view drying chambers are arranged above the main flue, the walls of which are made of sheet-iron or of other heat-conducting-material, those portions of the walls at which heat might be lost towards the outer side being made of a material which is a poor heat-conductor.

These drying chambers are prismatic and heated by the flue-gases flowing along the walls of the chambers.

The two ends of each drying chamber are closed by doors.

The drying material is made to travel through the chambers on trucks, or it is placed on stationary supports.

Dampers in the roof of the main flue serve to direct the flue-gas into the spaces between the walls of every two adjacent drying chambers, the flue-gas being returned into the main flue at the opposite end of the drying apparatus.

In order to obtain larger heating surfaces also in wide drying chambers a system of heating chambers is arranged extending downwards from the bottom-plate of the drying chamber. These heating chambers are open at the upper end and connected with the bottom end of the drying chambers in such a manner that the air from the drying chambers can flow through these heating chambers. The heating chambers are arranged at longer or shorter distances apart and the flue-gases flow through the spaces between the heating chambers in giving up their heat to the sheet-iron-walls and from these to the drying chamber.

Two embodiments of the invention are illustrated, by way of example, in the accompanying drawing in which:—

Fig. 1 is a longitudinal section taken on the line 1—1 of Fig. 2 showing a dryer comprising three drying chambers, and the main flue under the dryer.

Fig. 2 is a cross-section on line 2—2 of Fig. 1, showing the dryer and the main flue.

Fig. 3 is a horizontal section of the dryer taken on line 3—3 of Fig. 2.

Fig. 4 is a longitudinal section on the line 4—4 of Fig. 5, showing a dryer of other construction with one drying chamber, in which the heating surface is enlarged at the bottom of the drying chamber by means of separate heating surfaces.

Fig. 5 is a cross-section of Fig. 4 taken on the line 5—5 of Fig. 4.

Fig. 6 is a horizontal section on the line 6—6 of Fig. 5 through the dryer shown in Fig. 4.

Referring to Figs. 1, 2, 3, $a$—$a$ are the end-walls, $b$ is the top-plate, and $c$—$c$ are the side-walls of the drying apparatus, said walls being insulated against heat-radiation.

In the drying apparatus three drying chambers $d$ are arranged consisting each of two side-walls $e$ of sheet iron and a of a sheet-iron-bottom-plate $f$, a door $h$ being arranged at each end. The spaces $g$ between the drying chambers $d$ are open at the bottom-end $l$ so that the flue-gases from the main flue $i$ can flow into said spaces $g$ and out of the same along the path designated by arrow-lines, giving off their heat when flowing along the side-walls $e$ and bottom-plates $f$ of the drying chambers.

Dampers $k$ serve for guiding the flue-gases and for shutting off the dryer from the main flue, when the dryer is not in use. $k'$ and $k^2$ are dampers, designed to shut off the spaces $g$ from the main flue $i$.

In the form of construction shown in Figs. 4 to 6 the end-walls are designated by $m$, the roof or top-plate by $n$ and the side-walls of the dryer by $m'$. There is only one drying chamber $o$ formed by side-walls $p$ and having doors $q$ at the ends. From the bottom-plate $r$ of the drying chamber $o$ pockets $s$ extend downwards which are formed by sheet iron-plates t.

The spaces v between the pockets s communicate with the main flue y. The two compartments w between the side-walls p of the drying chamber o and the side-walls m' of the drying apparatus have openings at the lower ends through which the flue-gases from the main flue y can flow in and out, these flue-gases flowing at the same time through the spaces v between the pockets s in intensely heating the walls of the drying chamber o, which is thus strongly heated.

I claim:—

1. A drying apparatus comprising in combination with a flue having apertures, juxtaposed parallel prismatic drying chambers, with prismatic intermediate spaces above said flue and adapted to be heated by the flue gases flowing thereinto through the apertures, and means for selectively closing and opening said apertures.

2. A drying apparatus as specified in claim 1, comprising in combination with the flue and drying chambers having apertures in their bottom plates, dampers in said apertures of such length that in open position they rest on the bottom of said flue and serve as plates for deflecting the flue gases into said drying chambers.

In testimony whereof I affix my signature.

OSWALD PFEIFFER.